(12) United States Patent
Takii et al.

(10) Patent No.: US 11,267,017 B2
(45) Date of Patent: Mar. 8, 2022

(54) METHOD FOR APPLYING ULTRAVIOLET CURABLE COATING MATERIAL AND METHOD FOR PRODUCING ULTRAVIOLET CURED FILM

(71) Applicants: TOYOBO CO., LTD., Osaka (JP); NATIONAL INSTITUTE OF ADVANCED INDUSTRIAL SCIENCE AND TECHNOLOGY, Tokyo (JP)

(72) Inventors: Isao Takii, Otsu (JP); Yusuke Shibata, Otsu (JP); Shin-ichiro Kawasaki, Sendai (JP); Tatsuya Fujii, Sendai (JP)

(73) Assignees: TOYOBO CO., LTD., Osaka (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 785 days.

(21) Appl. No.: 15/999,737

(22) PCT Filed: Aug. 23, 2016

(86) PCT No.: PCT/JP2016/074477
§ 371 (c)(1),
(2) Date: Aug. 20, 2018

(87) PCT Pub. No.: WO2017/141467
PCT Pub. Date: Aug. 24, 2017

(65) Prior Publication Data
US 2020/0269275 A1  Aug. 27, 2020

(30) Foreign Application Priority Data
Feb. 19, 2016  (JP) .................................. 2016-029686

(51) Int. Cl.
*B05D 3/06* (2006.01)
*C09D 135/02* (2006.01)
(Continued)

(52) U.S. Cl.
CPC ............. *B05D 3/067* (2013.01); *B05D 1/025* (2013.01); *B05D 7/04* (2013.01); *C08J 7/18* (2013.01);
(Continued)

(58) Field of Classification Search
CPC . C09D 135/02; C09D 7/40; C09D 4/06; C08J 2433/04; C08J 2367/02;
(Continued)

(56) References Cited

U.S. PATENT DOCUMENTS 4,506,682 A * 3/1985 Muller .................. A24B 15/24
131/297
5,009,367 A * 4/1991 Nielsen .................. B05D 1/025
239/3

(Continued)

FOREIGN PATENT DOCUMENTS

JP   H01-258770 A   10/1989
JP   H05-068936 A    3/1993
(Continued)

OTHER PUBLICATIONS

Korean Intellectual Property Office, Office Action in Korean Patent Application No. 10-2018-7024265 (dated May 4, 2020).
(Continued)

*Primary Examiner* — Sanza L. McClendon
(74) *Attorney, Agent, or Firm* — Leydig, Voit & Mayer, Ltd.

(57) ABSTRACT

A method for applying an ultraviolet curable coating material and a method for producing an ultraviolet cured film include the steps of: supplying an ultraviolet curable coating
(Continued)

material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid under a condition of a critical pressure or more of the carbon dioxide to form a coating film; and irradiating the coating film with ultraviolet rays to form an ultraviolet cured film.

7 Claims, 1 Drawing Sheet

(51) Int. Cl.
  B05D 1/02    (2006.01)
  B05D 7/04    (2006.01)
  C08J 7/18    (2006.01)
(52) U.S. Cl.
  CPC ......... C09D 135/02 (2013.01); *C08J 2335/02* (2013.01)
(58) Field of Classification Search
  CPC ..... C08J 2335/02; C08J 7/18; B05D 2401/31; B05D 2201/02; B05D 7/24; B05D 7/04; B05D 3/067; B05D 3/0413; B05D 1/025; B05D 1/02; B05D 7/267; B05D 7/1673; B01F 13/0059; B01F 3/0865; B01F 3/0092
  USPC .......................... 522/113, 121, 122
  See application file for complete search history.

(56) References Cited

U.S. PATENT DOCUMENTS

| | | | |
|---|---|---|---|
| 5,027,742 A | 7/1991 | Lee et al. | |
| 5,171,613 A * | 12/1992 | Bok ...................... | B01F 5/0619 427/422 |
| 5,197,800 A * | 3/1993 | Saidman .................. | B29B 7/826 366/136 |
| 5,203,843 A * | 4/1993 | Hoy ....................... | B05D 1/025 239/135 |
| 5,211,342 A * | 5/1993 | Hoy ........................ | C09D 7/00 239/707 |
| 5,362,519 A | 11/1994 | Argyropoulos et al. | |
| 5,443,796 A * | 8/1995 | Coeling .................. | B29B 7/826 422/129 |
| 8,864,044 B2 * | 10/2014 | Suzuki .................. | B05B 7/0483 239/13 |
| 2012/0097751 A1 | 4/2012 | Suzuki et al. | |

FOREIGN PATENT DOCUMENTS

| | | |
|---|---|---|
| JP | H05-277429 A | 10/1993 |
| JP | 2006-526688 A | 11/2006 |
| JP | 2008-012453 A | 1/2008 |
| JP | 2010-234348 A | 10/2010 |
| JP | 2010-234349 A | 10/2010 |
| JP | 2012-086150 A | 5/2012 |
| JP | 2012-086151 A | 5/2012 |
| JP | 2012-086175 A | 5/2012 |
| JP | 2012-224700 A | 11/2012 |
| JP | 2013-189545 A | 9/2013 |
| JP | 2014-223599 A | 12/2014 |
| JP | 5923677 B1 | 5/2016 |
| JP | 5972435 B1 | 8/2016 |
| JP | 6006448 B1 | 10/2016 |
| WO | WO 2004/108844 A2 | 12/2004 |
| WO | WO 2010/113489 A1 | 10/2010 |

OTHER PUBLICATIONS

Kawasaki, "'Green' Spray Coating Technology Using High Pressure $CO_2$ for Diluent," *Journal of the Institute of Electrostatics Japan*, 39(3): 116-120 (2015).
Suzuki et al., "Development of carbon dioxide coating technology using high-pressure micromixer," *Journal of Japan Coating Technology Association*, 44(7): 230-238 (2009).
Taki et al., "Formation of Microstructure by Photoinduced Polymerization Phase Separation of Supercritical Carbon Dioxide, UV Curing Monomer and Oligomer," *Abstracts of the 41$^{st}$ Autumn Meeting of the Society of Chemical Engineers, Japan*, p. 700, Abstract Q121 (Aug. 16, 2009).
Toyobo Co., Ltd., et al., "Document to be Submitted for the Certificate for the Application of Exceptions to Loss of Novelty" submitted to Japanese Patent Office for Japanese Patent Application No. 2016-029686 (dated Mar. 14, 2016) [including (1) Kawasaki et al., "High Pressure Spray Deposition Technique Utilizing Reduction in Viscosity by Addition of $CO_2$," 47th Autumn Meeting of the Society of Chemical Engineers, Japan, Abstract O219 [http://www3.scej.org/meeting/47f/abst/0219.pdf] (website disclosure on Aug. 26, 2015) and (2) Kawasaki et al., "High Pressure Spray Deposition Technique Utilizing Reduction in Viscosity by Addition of $CO_2$," 47th Autumn Meeting of the Society of Chemical Engineers, Japan, presentation, slides 1-16 (Sep. 10, 2015)]].
Toyobo Co., Ltd. et al., "Petition" submitted to Japanese Patent Office for Japanese Patent Application No. 2016-029686 (dated Mar. 14, 2016) [including Kawasaki et al., "High Pressure Spray Deposition Technique Utilizing Reduction in Viscosity by Addition of $CO_2$," 47th Autumn Meeting of the Society of Chemical Engineers, Japan, presentation, slides 17-19 (Sep. 10, 2015)]].
Japanese Patent Office, International Search Report in International Patent Application No. PCT/JP2016/074477 (dated Nov. 15, 2016).
Japanese Patent Office, Notice of Grounds of Rejection in Japanese Patent Application No. 2016-029686 (dated Jan. 7, 2020).

* cited by examiner

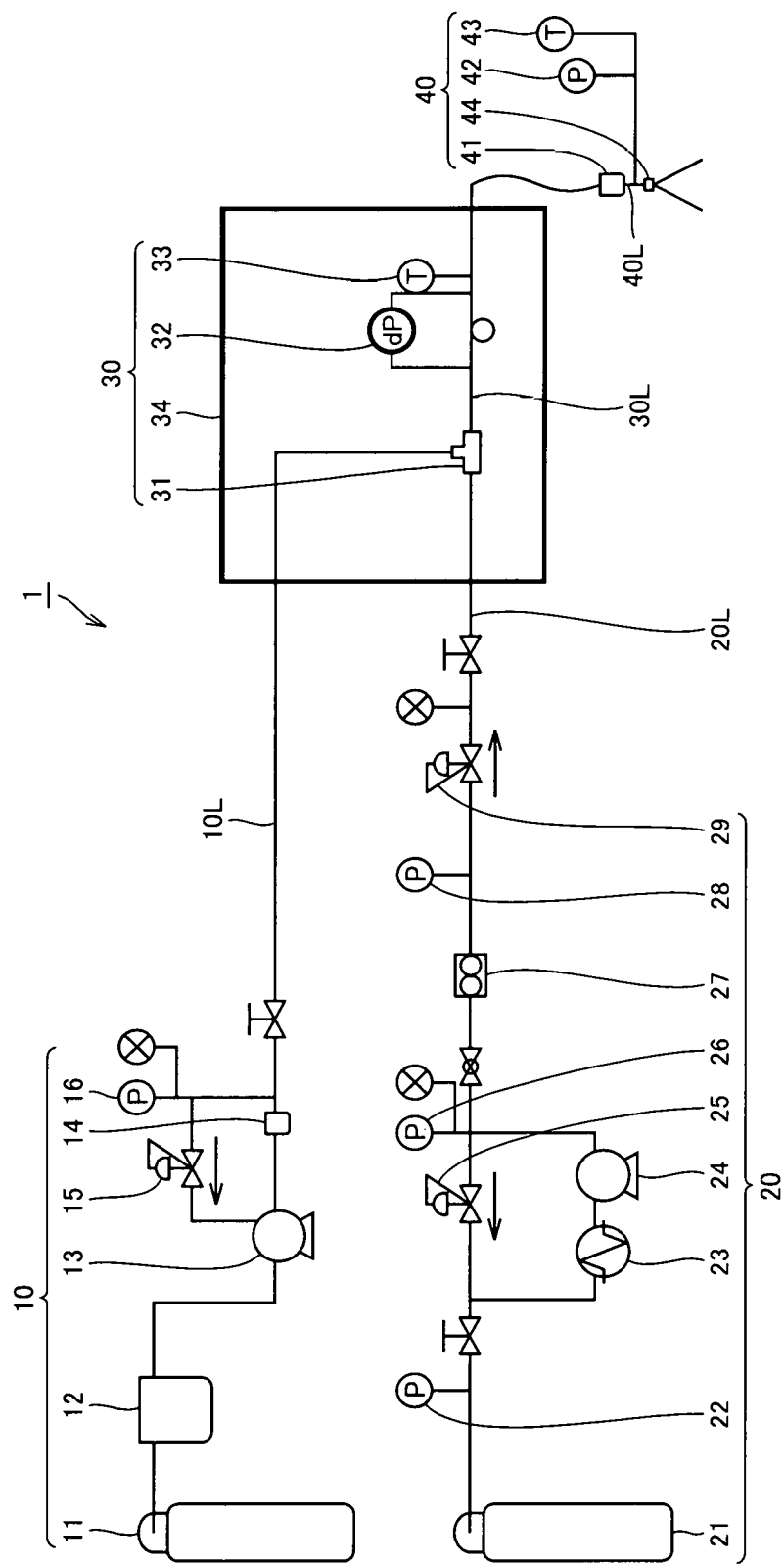

METHOD FOR APPLYING ULTRAVIOLET CURABLE COATING MATERIAL AND METHOD FOR PRODUCING ULTRAVIOLET CURED FILM

CROSS-REFERENCE TO RELATED APPLICATIONS

This patent application is the U.S. national phase of International Patent Application No. PCT/JP2016/074477, filed Aug. 23, 2016, which claims the benefit of Japanese Patent Application No. 2016-029686, filed on Feb. 19, 2016, which are incorporated by reference in their entireties herein.

TECHNICAL FIELD

The present invention relates to a method for applying an ultraviolet curable coating material using carbon dioxide, and a method for producing an ultraviolet cured film. Specifically, the present invention relates to a method for applying an ultraviolet curable coating material and a method for producing an ultraviolet cured film that provide a low environmental load type cured film in safe having excellent planarity and good appearance quality as with the conventional method, since a volatile organic compound (hereinafter also referred to as VOC) is not discharged by totally replacing an organic solvent used in large quantities in the conventional application of an ultraviolet curable coating material with carbon dioxide and carrying the application under specific conditions.

BACKGROUND ART

Various methods are used for coating a workpiece to be coated depending on the shape of the workpiece to be coated. For example, slot die, bar coating, roll coating, and gravure coating and the like are generally used for a planar (two-dimensional) workpiece to be coated such as a plastic film. On the other hand, in the case of coating a cubic (three-dimensional) workpiece to be coated such as a plastic member, or the planar workpiece to be coated is subjected to coating in a noncontact manner, spray coating is mainly used.

In these coating techniques, it is common to dilute a coating material with an organic solvent to lower the viscosity of the coating material for use in order to obtain good coating appearance and coating quality. In order to reduce the thickness of the coating film to be obtained, it is common to dilute the coating material with the organic solvent to lower the solid content concentration of the coating material. For this reason, coating industries have a large problem that the discharge of VOC from processes is so large. VOC is a hazardous chemical substance leading to global warming, and causes safety problems (ignition, explosion, health damage, and the like). Efforts to reduce the discharge of VOC have been under way.

Measures to reduce VOC include conversion to a water-based coating material, production of a coating material with a reduced organic solvent such as a high-solid coating material, and technological developments such as recovery and decomposition treatment of a wasted organic solvent.

Japanese Patent Laying-Open No. H01-258770 (PTD 1) proposes a technique of utilizing carbon dioxide in place of an organic solvent as a novel application method that can be replaced for conventional application using an organic solvent. This technique shows that high-pressure carbon dioxide continuously supplied under a high pressure is mixed with and dissolved in a coating material continuously supplied under a high pressure in a similar manner so that the viscosity of the coating material is lowered to a sprayable level, whereby the coating material can be applied. Thereafter, in relation to this, a plurality of PTDs such as Japanese Patent Laying-Open Nos. 2010-234348 (PTD 2), 2010-234349 (PTD 3), 2012-86150 (PTD 4), 2012-86151 (PTD 5), and 2014-223599 (PTD 6) and the like have been proposed.

CITATION LIST

Patent Document

PTD 1: Japanese Patent Laying-Open No. H01-258770
PTD 2: Japanese Patent Laying-Open No. 2010-234348
PTD 3: Japanese Patent Laying-Open No. 2010-234349
PTD 4: Japanese Patent Laying-Open No. 2012-86150
PTD 5: Japanese Patent Laying-Open No. 2012-86151
PTD 6: Japanese Patent Laying-Open No. 2014-223599

SUMMARY OF INVENTION

Technical Problems

However, in any of these patent documents, a coating material containing an organic solvent (a mixture of a polymer and a true solvent that dissolves the polymer to impart fluidity) is used as a main agent in order to improve finish quality. The system contains a certain amount of organic solvent. That is, even when a diluting solvent is totally replaced with carbon dioxide, the system contains the organic solvent derived from the coating material, so that the system is not in a complete non-organic solvent state.

In such a case, it is necessary to take measures to alleviate safety problems (ignition, explosion, health damage, and the like) due to VOC in the vicinity of the coated part, and it results in still remaining problems such as an increase in equipment size and an increase in construction cost. For this reason, the complete elimination of the organic solvent in a process including a component in the coating material has been strongly required in the art.

Then, it is an object of the present invention to provide a method for applying an ultraviolet curable coating material and a method for producing an ultraviolet cured film that provide a low environmental load type cured film in safe having excellent planarity and good appearance quality by totally replacing an organic solvent with carbon dioxide and carrying the application under specific conditions to reduce VOC.

Solution to Problems

That is, the present invention includes the following constitutions.

[1] A method for applying an ultraviolet curable coating material, the method including the steps of: supplying an ultraviolet curable coating material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid under a condition of a critical pressure or more of the carbon dioxide to form a coating film; and irradiating the coating film with ultraviolet rays to form an ultraviolet cured film.

[2] The method for applying an ultraviolet curable coating material according to the above [1], in which in the mixed fluid, the carbon dioxide is mixed at an addition concentration greater than or equal to 1.0 time and less than or equal to 4.0 times of a saturation solubility in the ultraviolet curable coating material.

[3] The method for applying an ultraviolet curable coating material according to the above [1] or [2], in which a temperature of the mixed fluid before nozzle spraying is heated at greater than or equal to 30° C. and less than or equal to 80° C.

[4] The method for applying an ultraviolet curable coating material according to any one of the above [1] to [3], in which the mixer is a micro mixer having a micro flow path having a flow path diameter of less than or equal to 1 mm.

[5] The method for applying an ultraviolet curable coating material according to any one of the above [1] to [4], in which the ultraviolet curable acrylic monomer contains a trifunctional or higher acrylic polyfunctional monomer, or the acrylic polyfunctional monomer and a bifunctional or lower acrylic non-polyfunctional monomer, and the ultraviolet curable coating material further contains a photopolymerization initiator.

[6] The method for applying an ultraviolet curable coating material according to any one of the above [1] to [5], in which the ultraviolet curable coating material does not contain an organic solvent.

[7] A method for producing an ultraviolet cured film, the method including the steps of: supplying an ultraviolet curable coating material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid under a condition of a critical pressure or more of the carbon dioxide to form a coating film; and irradiating the coating film with ultraviolet rays to form an ultraviolet cured film.

[8] A method for producing an ultraviolet cured film on a plastic film, the method including the steps of: supplying an ultraviolet curable coating material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid on a plastic film serving as a workpiece to be coated under a condition of a critical pressure or more of the carbon dioxide to form a coating film; and irradiating the coating film with ultraviolet rays to form an ultraviolet cured film.

Advantageous Effect of Invention

The present invention can provide a method for applying an ultraviolet curable coating material and a method for producing an ultraviolet cured film that provide a low environmental load type cured film in safe having excellent planarity and good appearance quality by totally replacing an organic solvent with carbon dioxide and carrying the application under specific conditions, that is, by using an ultraviolet curable coating material containing an ultraviolet curable monomer not containing an organic solvent as a coating material and carbon dioxide and carrying the application under specific conditions.

BRIEF DESCRIPTION OF DRAWING

FIG. 1 is a schematic diagram showing an example of an applying apparatus used in a method for applying an ultraviolet curable coating material and a method for producing an ultraviolet cured film according to the present invention.

DESCRIPTION OF EMBODIMENTS

Hereinafter, embodiments of the present invention will be described in detail.

Embodiment 1: Method for Applying Ultraviolet Curable Coating Material

A method for applying an ultraviolet curable coating material according to the present embodiment includes the steps of: supplying an ultraviolet curable coating material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid under a condition of a critical pressure or more of the carbon dioxide to form a coating film; and irradiating the coating film with ultraviolet rays to form an ultraviolet cured film. The method for applying an ultraviolet curable coating material of the present embodiment can provide a method for applying an ultraviolet curable coating material that reduces VOC, is in safe, and provides a cured film having excellent planarity and good appearance quality.

(Workpiece to be Coated)

Examples of a workpiece to be coated to which the method for applying an ultraviolet curable coating material of the present embodiment is applied include, but are not particularly limited to, a plastic product, cloth, paper, and a metal steel plate, and further include an article having a cubic (three-dimensional) structure. The application method is also suitable for non-contact coating for a workpiece to be coated having a planar (two-dimensional) structure such as a plastic film.

(Ultraviolet Curable Coating Material)

The ultraviolet curable coating material used in the method for applying an ultraviolet curable coating material of the present embodiment contains an ultraviolet curable acrylic monomer that has a solid content of 100% and is not diluted with an organic solvent. The ultraviolet curable acrylic monomer preferably contains a trifunctional or higher acrylic polyfunctional monomer, or the acrylic polyfunctional monomer and a bifunctional or lower acrylic non-polyfunctional monomer. A mass ratio between the acrylic polyfunctional monomer and the acrylic non-polyfunctional monomer is not particularly limited. For example, 100:0 to 50:50 can be exemplified from the viewpoint of forming suitable coating film and cured film. Use of the ultraviolet curable acrylic monomer as a coating material makes it possible to provide a coated workpiece without discharging an organic solvent. Herein, the acrylic polyfunctional monomer plays a role mainly in constituting the coating film. The acrylic non-polyfunctional monomer plays a role in contributing to reduction in the viscosity of the coating material, ease of handleability, and improvement in planarity of each of the coating film and the cured film. The mixing of both the monomers at an arbitrary ratio makes it possible to adjust the performance of each of the coating film and the cured film.

Examples of the acrylic polyfunctional monomer include, but are not particularly limited to, trimethylolpropane tri(meth)acrylate, ethylene oxide modified trimethylolpropane tri(meth)acrylate, propylene oxide modified trimethylolpropane tri(meth)acrylate, trimethylolethane tri(meth)acrylate, pentaerythritol tri(meth)acrylate, pentaerythritol tetra(meth)acrylate, ethylene oxide modified pentaerythritol tetra(meth)acrylate, dipentaerythritol penta(meth)acrylate, dipentaerythritol hexa(meth)acrylate, ethylene oxide modified dipentaerythritol penta(meth)acrylate, caprolactone modified dipentaerythritol penta(meth)acrylate, tripentaerythritol poly(meth)acrylate, glycerol(meth)acrylate, ethylene oxide modified glycerol(meth)acrylate, and dipentaerythritol hexa(meth)acrylate. These compounds may be used alone, or two or more thereof may be used in combination. When 50% by mass or more of the acrylic polyfunctional monomer is present, acrylic non-polyfunctional monomers such as an acrylic monofunctional monomer and an acrylic bifunctional monomer may be mixed.

Examples of the acrylic bifunctional monomer of the acrylic non-polyfunctional monomer include, but are not particularly limited to, 1,6-hexanediol diacrylate, ethylene glycol diacrylate, neopentyl glycol diacrylate, and triethylene glycol diacrylate. These compounds may be used alone, or two or more thereof may be used in combination.

Examples of the acrylic monofunctional monomer of the acrylic non-polyfunctional monomer include, but are not particularly limited to, ethyl acrylate, butyl acrylate, 2-ethylhexyl acrylate, nonyl acrylate, lauryl acrylate, tridecyl acrylate, hexadecyl acrylate, octadecyl acrylate, isoamyl acrylate, isodecyl acrylate, isostearyl acrylate, cyclohexyl acrylate, benzyl acrylate, methoxyethyl acrylate, butoxyethyl acrylate, phenoxyethyl acrylate, phenoxydiethylene glycol acrylate, nonyl phenoxyethyl acrylate, tetrahydrofurfuryl acrylate, glycidyl acrylate, 2-hydroxyethyl acrylate, 2-hydroxy-3-phenoxypropyl acrylate, 3-chloro-2-hydroxypropyl acrylate, diethylaminoethyl acrylate, nonylphenoxyethyl tetrahydrofurfuryl acrylate, caprolactone modified tetrahydrofurfuryl acrylate, isobornyl acrylate, dicyclopentanyl acrylate, and dicyclo pentenyloxyethyl acrylate.

The ultraviolet curable coating material used in the method for applying an ultraviolet curable coating material of the present embodiment preferably contains a photopolymerization initiator together with the ultraviolet curable acrylic monomer. The ultraviolet curable coating material contains the photopolymerization initiator, whereby a resin component is satisfactorily polymerized by irradiation with active energy rays such as ultraviolet rays. This makes it possible to form a suitable cured film. Examples of the addition amount of the photopolymerization initiator include, but are not particularly limited to, greater than or equal to 0.5 parts by mass and less than or equal to 10 parts by mass with respect to a total of 100 parts by mass of the acrylic polyfunctional monomer and the acrylic non-polyfunctional monomer. The photopolymerization initiator is not particularly limited as long as it is a compound that absorbs ultraviolet rays to generate radicals, cations, and/or anions. Examples thereof include an alkylphenone-based photopolymerization initiator, an acylphosphine oxide-based photopolymerization initiator, a titanocene-based photopolymerization initiator, and an oxime ester-based polymerization initiator.

Examples of the alkylphenone-based photopolymerization initiator include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, and 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone.

Examples of the acylphosphine oxide-based photopolymerization initiator include 2,4,6-trimethylbenzoyl-diphenylphosphine oxide and bis(2,4,6-trimethylbenzoyl)-phenylphosphine oxide.

Examples of the titanocene-based photopolymerization initiator include bis($\eta$5-2,4-cyclopentadien-1-yl)-bis(2,6-difluoro-3-(1H-pyrrol-1-yl)-phenyl)titanium.

Examples of the oxime ester-based polymerization initiator include 1,2-octanedione, 1-[4-(phenylthio)-2-(O-benzoyloxime)], ethanone, 1-[9-ethyl-6-(2-methylbenzoyl)-9H-carbazol-3-yl]-1-(O-acetyloxime), oxyphenylacetic acid, 2-[2-oxo-2-phenylacetoxyethoxy]ethyl ester, and 2-(2-hydroxyethoxy)ethyl ester.

The photopolymerization initiators may be used alone, or two or more thereof may be used in combination.

Furthermore, the ultraviolet curable coating material used in the method for applying an ultraviolet curable coating material of the present embodiment may contain other fillers together with the ultraviolet curable acrylic monomer, or together with the ultraviolet curable acrylic monomer and the photopolymerization initiator as long as they do not hinder the mixing with carbon dioxide, the formation of the coating film, and the formation of the ultraviolet cured film. Herein, examples of the other fillers include an inorganic pigment, an antioxidant, a heat stabilizer, a weathering stabilizer, an ultraviolet absorber, a yellowing inhibitor, an organic lubricant, a pigment, a dye, organic or inorganic fine particles, a filler, an antistatic agent, a surfactant, a leveling agent, a nucleating agent, a diffusing agent, and a wax agent.

From the viewpoint of reducing VOC to provide application in safe, the ultraviolet curable coating material does not contain an organic solvent. Herein, the expression "the ultraviolet curable coating material does not contain an organic solvent" means that the ultraviolet curable coating material does not contain an organic solvent for diluting the ultraviolet curable acrylic monomer and the other fillers that are components thereof. The organic solvent inevitably contained in the ultraviolet curable acrylic monomer and the other fillers may be contained. That is, the expression that the ultraviolet curable coating material does not contain an organic solvent means that it substantially contains no organic solvent. The organic solvent is not particularly limited as long as it can dilute the ultraviolet curable coating material, and examples thereof include methyl ethyl ketone, acetone, ethyl acetate, toluene, tetrahydrofuran, and methyl isobutyl ketone.

(Applying Apparatus)

With reference to FIG. 1, an applying apparatus 1 used in the method for applying an ultraviolet curable coating material of the present embodiment includes a coating material supply part 10, a carbon dioxide supply part 20, a mixing part 30, and a spray part 40. In applying apparatus 1, a coating material supply line 10L of coating material supply part 10 is preferably different from a carbon dioxide supply line 20L of carbon dioxide supply part 20. Coating material supply part 10 includes a nitrogen gas cylinder 11 for storing nitrogen gas that is a pressurized gas for pressure-feeding an ultraviolet curable coating material, a coating material tank 12 for storing the ultraviolet curable coating material, a coating material high-pressure pump 13 for pressurizing the ultraviolet curable coating material to a predetermined pressure, a filter 14, a coating material primary pressure adjusting valve 15 for adjusting the discharge pressure of the coating material high-pressure pump and returning the excess coating material to the coating material tank, and a pressure gauge 16 in that order on coating material supply line 10L. Carbon dioxide supply part 20 includes a carbon dioxide cylinder 21 for storing carbon dioxide, a pressure gauge 22, a cooler 23 for cooling the carbon dioxide to a predetermined temperature, a carbon dioxide high-pressure pump 24 for pressurizing the carbon dioxide to a predetermined pressure, a carbon dioxide primary pressure adjusting valve 25 for adjusting the discharge pressure of the carbon dioxide high-pressure pump and returning the excess carbon dioxide to the carbon dioxide cylinder, a pressure gauge 26, a flow meter 27, a pressure gauge 28, and a carbon dioxide supply line back pressure valve 29 for maintaining the discharge pressure of the carbon dioxide high-pressure pump at a pressure higher than the pressure of the mixer by a predetermined pressure (for example, 1 MPa) or more in that order on carbon dioxide supply line 20L. Mixing part 30 includes a mixer 31 for mixing an ultraviolet curable coating material and carbon dioxide, a differential pressure transmitter 32 for calculating the viscosity of the mixed fluid, and a thermometer 33 in that order on a mixing line 30L. Furthermore, mixing part 30 includes a temperature adjuster 34 for adjusting the temperatures of the mixer, differential pressure transmitter, and thermometer. Spray part 40 includes a filter 41, a pressure gauge 42, a thermometer 43, and a spray gun 44 in that order on a spray line 40L.

(Application Method)

The method for applying an ultraviolet curable coating material of the present embodiment includes the steps of: supplying an ultraviolet curable coating material containing an ultraviolet curable acrylic monomer into a mixer under a condition of greater than or equal to 8 MPa without diluting the ultraviolet curable coating material with an organic solvent (hereinafter also referred to as ultraviolet curable coating material supplying step); supplying carbon dioxide with a critical pressure or more into the mixer (hereinafter also referred to as carbon dioxide supplying step); mixing the ultraviolet curable coating material and the carbon dioxide supplied into the mixer to form a mixed fluid (hereinafter referred to as mixed fluid forming step); spraying the mixed fluid under a condition of a critical pressure or more of the carbon dioxide to form a coating film (hereinafter also referred to as coating film forming step); and irradiating the coating film with ultraviolet rays to form an ultraviolet cured film (hereinafter also referred to as ultraviolet cured film forming step).

In the method for applying an ultraviolet curable coating material of the present embodiment, from the viewpoint of increasing the applying efficiency, it is preferable that the ultraviolet curable coating material supplying step and the carbon dioxide supplying step are performed in parallel or at the same time. Furthermore, from the viewpoint of increasing the applying efficiency, it is preferable that the ultraviolet curable coating material supplying step, the carbon dioxide supplying step, the mixed fluid forming step, and the coating film forming step are continuously performed.

(Ultraviolet Curable Coating Material Supplying Step)

The ultraviolet curable coating material supplying step is performed by supplying the ultraviolet curable coating material containing the ultraviolet curable acrylic monomer into mixer 31 under a condition of greater than or equal to 8 MPa without diluting the ultraviolet curable coating material with the organic solvent. The pressure of the ultraviolet curable coating material supplied into mixer 31 is greater than or equal to 8 MPa. Consequently, the ultraviolet curable coating material can be reliably and easily supplied into mixer 31. The pressure of the ultraviolet curable coating material supplied into mixer 31 can be adjusted by coating material primary pressure adjusting valve 15. The excess coating material corresponding to a flow rate at which the pressure of coating material primary pressure adjusting valve 15 becomes excess is preferably returned to a pump suction of coating material high-pressure pump 13. Although coating material high-pressure pump 13 is not particularly limited, use of a gear pump can be avoided because the generation of radicals due to mechanical stress of the ultraviolet curable acrylic monomer is not preferable. However, when the viscosity of the monomer is sufficiently high, a mono pump and a diaphragm pump having a large gauge are often used.

The temperature of the ultraviolet curable coating material supplied into mixer 31 is preferably greater than or equal to 30° C. and less than or equal to 80° C. When the temperature of the ultraviolet curable coating material is greater than or equal to 30° C., the viscosity of the fluid is not excessively increased, so that it is easy to handle the ultraviolet curable coating material. When the temperature of the ultraviolet curable coating material is less than or equal to 80° C., there is no fear of thermal decomposition of the monomer as the coating material. From this viewpoint, it is preferable that coating material supply part 10 of applying apparatus 1 further includes a coating material heater for heating the supplied ultraviolet curable acrylic monomer to the predetermined temperature. The type of the coating material heater is not particularly limited. However, when the operation of the apparatus is started or when the flow rate is changed, it is required that the temperature is controlled to be constant as quickly as possible, or the temperature of the ultraviolet curable coating material does not change largely when spray is temporarily stopped because of the switching of the coated surface and the like and the spray is started again. For this reason, a tank/coil type heat exchanger is suitably used in which a high-pressure pipe through which an ultraviolet curable coating material passes is immersed in a coil form in a tank filled with a heating medium (usually, water), as compared with an electric heating type heater that is generally used.

(Carbon Dioxide Supplying Step)

The carbon dioxide supplying step is performed by supplying carbon dioxide with a critical pressure or more into mixer 31. The pressure of the carbon dioxide supplied into mixer 31 is the critical pressure (7.4 MPa) or more. When the carbon dioxide is in a supercritical state, the carbon dioxide has both liquid solubility and gas diffusivity, so that the carbon dioxide can be uniformly mixed with the coating material, and a uniform mixture is obtained. The pressure of the carbon dioxide supplied into mixer 31 can be adjusted by carbon dioxide primary pressure adjusting valve 25. The excess carbon dioxide corresponding to a flow rate at which the pressure of carbon dioxide primary pressure adjusting valve 25 becomes excess is preferably returned to a pump suction of carbon dioxide high-pressure pump 24. Carbon dioxide high-pressure pump 24 is not particularly limited, and a piston pump, a diaphragm pump, and a plunger pump and the like are used. However, the carbon dioxide is advantageously pressurized in a liquid carbon dioxide form. In this case, cooling in the previous stage of the pump is required.

The temperature of the carbon dioxide supplied into mixer 31 is preferably greater than or equal to 31.1° C. (critical temperature). Herein, the critical state refers to a state beyond limit pressure/temperature (critical point) at which gas and liquid can coexist, and shows properties different from those of ordinary gases and liquids. In the critical point of the carbon dioxide, the critical pressure is 7.4 MPa and the critical temperature is 31.1° C. From this viewpoint, it is preferable that carbon dioxide supply part 20 of applying apparatus 1 further includes cooler 23 for cooling the excess carbon dioxide returned to the pump suction of carbon dioxide high-pressure pump 24 to the predetermined temperature, and a carbon dioxide heater for heating the pressurized carbon dioxide to the predetermined temperature. The type of the carbon dioxide heater is not particularly limited. However, when the operation of the apparatus is started or when the flow rate is changed, it is required that the temperature is controlled to be constant as quickly as possible, or the temperature of the carbon dioxide does not change largely when spray is temporarily stopped because of the switching of the coated surface and the like and the spray is started again. For this reason, a tank/coil type heat exchanger is suitably used in which a high-pressure pipe through which carbon dioxide passes is immersed in a coil form in a tank filled with a heating medium (usually, water), as compared with an electric heating type heater that is generally used.

(Mixed Fluid Forming Step)

The mixed fluid forming step is performed by mixing the ultraviolet curable coating material and carbon dioxide supplied into the mixer. Mixer 31 used for mixing the ultraviolet curable coating material and the carbon dioxide is not particularly limited, and from the viewpoint of efficient and uniform mixing, a micro mixer having a micro flow path having a flow path diameter of less than or equal to 1 mm is preferable.

In the method for applying an ultraviolet curable coating material of the present embodiment, it is necessary to efficiently mix the ultraviolet curable coating material and the carbon dioxide to dissolve the carbon dioxide in the ultraviolet curable coating material. Although an inline mixer in the form of a static mixer applying the principle of fluid multistage separation has conventionally been used for this purpose, it is not always possible to realize adequate mixing and dissolution with this type of mixer. In the method for applying an ultraviolet curable coating material of the present embodiment, a micro mixer is used, and a high-pressure micro mixer that can mix a high-pressure fluid is preferably used. Herein, the micro mixer refers to a mixer having a flow path diameter of less than or equal to 1 mm and utilizing the principle of micro mixing.

Although the type of the high-pressure micro mixer is not particularly limited, in consideration of the high viscosity, blockage property and the like of the ultraviolet curable coating material, a turbulent flow-type micro mixer that utilizes fluid turbulent mixing effects is more desirable than a mixer that has an interdigital channel structure for mixing two fluids in an extremely short diffusion distance (for example, laminar flow-type micro mixer available from IMM, Germany).

Examples of the turbulent flow-type micro mixers include a T-shaped mixer having a flow path diameter of less than or equal to 1 mm, a swirl-type micro mixer utilizing a swirl flow and having a main flow inner diameter of less than or equal to 1 mm and a secondary flow inner diameter of 0.8 mm or less, a center collision-type micro mixer causing fluid to collide in the center of a minute space and having an inner diameter of less than or equal to 1 mm, and a double tube-type micro mixer having an inner tube with an inner diameter (flow path diameter) of less than or equal to 1 mm. Suitable specific examples of the micro mixer include a T-shaped mixer SS-1F0-3GC having a flow path diameter of 0.3 mm (manufactured by Swagelok), a swirl type micro mixer utilizing a swirling flow and having a main flow inner diameter of 0.8 mm and a secondary flow inner diameter of 0.5 mm as described in Japanese Patent Laying-Open No. 2008-12453, and a center collision-type micro mixer having a structure described in Japanese Patent Laying-Open No. 2010-234348 and having an inner diameter of 1 mm.

In the method for applying an ultraviolet curable coating material of the present embodiment, the viscosity of the mixed fluid in the differential pressure transmitter after mixing is lower than the viscosity of the ultraviolet curable coating material when supplied. The viscosity of the ultraviolet curable coating material when supplied is data obtained by separately measuring, before feeding, the viscosity at the set temperature during the supply of the coating material using a rheometer. On the other hand, the viscosity of the mixed fluid after mixing is the viscosity calculated from the differential pressure in the differential pressure transmitter as described above. The temperature of the mixed fluid in mixing line 30L is preferably greater than or equal to 30° C. and less than or equal to 80° C. from the viewpoint of setting the temperature of the mixed fluid before nozzle spraying to greater than or equal to 30° C. and less than or equal to 80° C. From this viewpoint, it is preferable to include temperature adjuster 34 for adjusting the mixed fluid to the predetermined temperature. The type of temperature adjuster 34 is not particularly limited. However, when the operation of the apparatus is started or when the flow rate is changed, it is required that the temperature is controlled to be constant as quickly as possible, or the temperature of the mixed fluid does not change largely when spray is temporarily stopped because of the switching of the coated surface and the like and the spray is started again. For this reason, a temperature controller including a tank/coil type heat exchanger is suitably used in which a high-pressure pipe through which a mixed fluid passes is immersed in a coil form in a tank filled with a heating medium (usually, water), as compared with an electric heating type heater that is generally used.

In the mixed fluid, it is preferable that the carbon dioxide is mixed at an addition concentration greater than or equal to 1.0 time and less than or equal to 4.0 times of the saturation solubility in the ultraviolet curable coating material. The addition concentration is more preferably greater than or equal to 1.2 times and less than or equal to 3.5 times, and still more preferably greater than or equal to 1.5 times and less than or equal to 3.0 times. This is because, when the addition concentration is greater than or equal to 1.0 times, droplets are atomized when ejected from the spray gun and a spray angle is increased, so that uniform spray is achieved over a wide range. When the addition concentration is less than or equal to 4.0, the pressure in the system containing the mixed fluid is not excessively increased, and the load of the apparatus is suppressed, so that it is preferable. In a preferable embodiment, a stable two-phase mixture is provided by shortening a residence time from the mixer to the spray gun as much as possible. Herein, the saturation solubility of the carbon dioxide in the ultraviolet curable coating material can be determined from the state of the mixed fluid that is visible from a visualization window provided in the line after the mixer. The concentration of the carbon dioxide is changed, and the saturation is determined to be attained from a state where the bubbles of the carbon dioxide are visually observed. The concentration at the time can be taken as the saturation solubility. Alternatively, a capillary through which the mixed fluid of the ultraviolet curable coating material and the carbon dioxide flows is provided. A mechanism is provided that calculates the viscosity of the mixed fluid by measuring a differential pressure before and after the capillary. When the stability of the differential pressure is high, it can be determined as a one-phase state where the high-pressure carbon dioxide is dissolved in the coating material. When the differential pressure is unstable, it can be presumed as a two-phase state. Furthermore, the fluid ejected from the spray gun is visually observed. The fluid can be determined to be a one phase state where the high-pressure carbon dioxide is dissolved in the coating material under a condition that a liquid film is observed immediately after the fluid is blown out. The fluid can be presumed to be a two-phase state under a condition that a liquid film disappears immediately after the fluid is blown out to cause spray to spread at a wide angle.

(Coating Film Forming Step)

The coating film forming step is performed by spraying the mixed fluid at the critical pressure or more of the carbon dioxide. The spray pressure of the mixed fluid (referred to as pressure during spraying, the same applies hereinafter) depends on the flow characteristics of a nozzle orifice of the spray gun. The spray pressure of the mixed fluid is the critical pressure (7.4 MPa) or more of the carbon dioxide. When the spray pressure of the mixed fluid is the critical pressure or more of the carbon dioxide, the droplets of the spray are atomized, and a coating film having a uniform film thickness is likely to be achieved. The temperature of the mixed fluid before nozzle spraying is preferably greater than or equal to 30° C. and less than or equal to 80° C. When the temperature of the mixed fluid before nozzle spraying is greater than or equal to 30° C., the temperature of the mixed fluid after spraying is not excessively decreased and the viscosity of the mixed fluid is not excessively increased, so that a uniform film thickness is likely to be achieved. On the other hand, when the temperature of the mixed fluid before nozzle spraying is less than or equal to 80° C., there is no fear of thermal decomposition of the ultraviolet curable acrylic monomer as the coating material. From this viewpoint, it is preferable that spray part 40 of applying apparatus 1 further includes a spray heater for heating the mixed fluid to be sprayed to the predetermined temperature. The type of the spray heater is not particularly limited. However, when the operation of the apparatus is started or when the flow rate is changed, it is required that the temperature is controlled to be constant as quickly as possible, or the temperature of the mixed fluid does not change largely when spray is temporarily stopped because of the switching of the coated surface and the like and the spray is started again. For this reason, a tank/coil type heat exchanger is suitably used in which a high-pressure pipe through which a mixed fluid passes is immersed in a coil form in a tank filled with a heating medium (usually, water), as compared with an electric heating type heater which is generally used.

The spray gun used in the coating film forming step may be an airless type high-pressure spray gun. The final control of the spraying flow rate, the spray pressure, and the spray pattern depends on the opening diameter (equivalent diameter) of the high-pressure nozzle orifice attached to the spray gun and its shape, and accordingly the opening diameter and the shape of the opening are extremely important. The spraying flow rate is largely different depending on an application amount set per unit time. The coating material spraying flow rate is generally selected in a range of greater than or equal to 50 g/min and less than or equal to 500 g/min.

The coating film forming step provides a coating film having excellent planarity and good appearance quality.

(Coating film Heat Treatment Step)

From the viewpoint of further improving the planarity and appearance quality of the coating film, it is preferable that the method for applying an ultraviolet curable coating material of the present embodiment further includes the step of heat-treating the coating film after the coating film forming step (coating film heat treatment step). Rapid pressure decrease and volume expansion after ejection from the nozzle of the spray gun cause rapid decrease in temperature and increase in viscosity of the sprayed fine droplets. Therefore, for the purpose that the ultraviolet curable coating material deposited on the workpiece to be coated is hard to change from the shape during depositing and a smooth continuous film is efficiently formed, it is effective to heat-treat the coating film before irradiation with ultraviolet rays after the application, to decrease the viscosity of the coating material, and to increase the fluidity. A heat treatment apparatus is not particularly limited, and an ordinary hot air drier and the like can be suitably used. A heat treatment condition is not particularly limited, and examples thereof include holding at greater than or equal to 30° C. and less than or equal to 80° C. for greater than or equal to 5 seconds and less than or equal to 5 minutes.

(Ultraviolet Cured Film Forming Step)

The ultraviolet cured film forming step is performed by irradiating the coating film with ultraviolet rays. An ultraviolet irradiation apparatus is not particularly limited, and a high-pressure mercury lamp, a fusion H lamp, a xenon lamp, a metal halide lamp or the like can be used. The amount of light, and the arrangement of light sources, and the like are appropriately adjusted.

As described above, by the method for applying an ultraviolet curable coating material of the present embodiment, the coating film formed by spraying the ultraviolet curable coating material is irradiated with ultraviolet rays, so that a cured film (that is, ultraviolet cured film) is obtained. From this viewpoint, the method for applying an ultraviolet curable coating material of the present embodiment is also a method for producing an ultraviolet cured film.

Embodiment 2: Method for Producing Ultraviolet Cured Film

A method for producing an ultraviolet cured film of the present embodiment includes the steps of: supplying an ultraviolet curable coating material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid under a condition of a critical pressure or more of the carbon dioxide to form a coating film; and irradiating the coating film with ultraviolet rays to form an ultraviolet cured film. The method for producing an ultraviolet cured film of the present embodiment makes it possible to provide a production method that reduces VOC and provides an ultraviolet cured film having excellent planarity and good appearance quality in safe.

In the method for producing an ultraviolet cured film of the present embodiment, the step of forming a coating film may be the step of spraying the mixed fluid on a plastic film serving as the workpiece to be coated at the critical pressure or more of the carbon dioxide to form a coating film. That is, the method for producing an ultraviolet cured film of the present embodiment is a method for producing an ultraviolet cured film on a plastic film, the method including the steps of: supplying an ultraviolet curable coating material containing an ultraviolet curable acrylic monomer into a mixer under a condition of greater than or equal to 8 MPa without diluting the ultraviolet curable coating material with an organic solvent; supplying carbon dioxide with a critical pressure or more into the mixer; mixing the ultraviolet curable coating material and the carbon dioxide supplied into the mixer to form a mixed fluid; spraying the mixed fluid on a plastic film serving as a workpiece to be coated under a condition of a critical pressure or more of the carbon dioxide to form a coating film; and irradiating the coating film with ultraviolet rays to form an ultraviolet cured film. The method for producing an ultraviolet cured film makes it possible to provide a production method that reduces VOC and provides an ultraviolet cured film having excellent planarity and good appearance quality on the plastic film serving as the workpiece to be coated in safe.

In the method for producing an ultraviolet cured film of the present embodiment, as with the method for applying an ultraviolet curable coating material of Embodiment 1, the carbon dioxide in the mixed fluid is preferably mixed at an addition concentration greater than or equal to 1.0 time and less than or equal to 4.0 times of the saturation solubility in the ultraviolet curable coating material. It is preferable that the temperature of the mixed fluid before nozzle spraying is heated at greater than or equal to 30° C. and less than or equal to 80° C. It is preferable that the mixer is a micro mixer having a micro flow path having a flow path diameter of less than or equal to 1 mm. It is preferable that the ultraviolet curable acrylic monomer contains a trifunctional or higher acrylic polyfunctional monomer, or the acrylic polyfunctional monomer and a bifunctional or lower acrylic non-polyfunctional monomer, and the ultraviolet curable coating material further contains a photopolymerization initiator. The ultraviolet curable coating material does not contain an organic solvent. Herein, the expression "the ultraviolet curable coating material does not contain an organic solvent" means that the ultraviolet curable coating material does not contain an organic solvent for diluting the ultraviolet curable acrylic monomer and the other fillers that are components thereof. The organic solvent inevitably contained in the ultraviolet curable acrylic monomer and the other fillers may be contained.

In the method for producing an ultraviolet cured film of the present embodiment, the workpiece to be coated, the ultraviolet curable coating material (specifically, the ultraviolet curable acrylic monomer, the photopolymerization initiator and the like), the applying apparatus, and the application method (specifically, the ultraviolet curable coating material supplying step, the carbon dioxide supplying step, the mixed fluid forming step, the coating film forming step, the coating film heat treatment step, and the ultraviolet cured film forming step, and the like) are similar to those in the method for applying an ultraviolet curable coating material of the embodiment 1, and the descriptions thereof will not be repeated.

EXAMPLES

Hereinafter, a method for applying an ultraviolet curable coating material and a method for producing an ultraviolet cured film will be more specifically described with reference to examples and comparative examples, but the present invention is not limited to the following examples.

(Evaluation Method)

Hereinafter, evaluation methods used when the present ultraviolet curable coating material is applied and the present ultraviolet cured film is produced will be described.

(1) Applying Width

An applying thickness was measured over a full width at a pitch of 10 mm in a width direction for a sample in which the present ultraviolet curable coating material was applied on a PET (polyethylene terephthalate) film as a workpiece to be coated, using a reflectance spectrophotometer (FE-3000 manufactured by Otsuka Electronics Co., Ltd.). A portion having an applying thickness excluding 0 µm was taken as an applied part, and the width of the applied part was taken as an applying width. When the sample was totally coated in the sample film width of 300 mm, the applying width was set to 300 mm.

(2) Average Thickness

The average value of applying thicknesses calculated by using the reflectance spectrophotometer (FE-3000 manufactured by Otsuka Electronics Co., Ltd.) used when the applying width was calculated was taken as an average thickness.

(3) Three-Dimensional Central Plane Average Surface Roughness SRa

The three-dimensional central plane average surface roughness SRa is specified in ISO 25178, and a three-dimensional surface shape measuring apparatus Vertscan (R5500H-M100 manufactured by Ryoka Systems Inc. (measuring conditions: wave mode, measurement wavelength of 560 nm, objective lens of 10 times)) was used to obtain the three-dimensional central plane average surface roughness SRa. The number of measurements was set to 5, and the average value thereof was obtained. The fractions of the fifth decimal place or less were rounded off.

(Apparatus to be Used)

An applying apparatus 1 as shown in FIG. 1 was used. Applying apparatus 1 includes a coating material supply line 10L for supplying an ultraviolet curable coating material to a mixer 31, a carbon dioxide supply line 20L for supplying carbon dioxide into mixer 31, a mixing line 30L for mixing the supplied ultraviolet curable coating material and the carbon dioxide, and a spray line 40L for spraying the mixed fluid. In coating material supply line 10L, a nitrogen gas cylinder 11, a coating material tank 12, a coating material high-pressure pump 13, a filter 14, a coating material primary pressure adjusting valve 15, and a pressure gauge 16 were disposed in that order. In carbon dioxide supply line 20L, a carbon dioxide cylinder 21, a pressure gauge 22, a cooler 23, a carbon dioxide high-pressure pump 24, a carbon dioxide primary pressure adjusting valve 25, a pressure gauge 26, a flow meter 27, a pressure gauge 28, and a carbon dioxide supply line back pressure valve 29 were disposed in that order. In mixing line 30L, a mixer 31, a differential pressure transmitter 32, and a thermometer 33 were disposed in that order, and a temperature adjuster 34 for adjusting the temperatures thereof was disposed. In spray line 40L, a filter 41, a pressure gauge 42, a thermometer 43, and a spray gun 44 were disposed in that order.

As coating material high-pressure pump 13, a Milflow control volume pump was used. As carbon dioxide high-pressure pump 24, a twin plunger pump was used. As mixer 31, a ¹⁄₁₆ inch T joint having a flow path diameter of 0.3 mm after mixing as a micro mixer was used. Temperature adjuster 34 was controlled to 60±1° C. by using a coil type heat exchanger that circulates warm water as a heat medium.

Herein, the temperature during the supply of the ultraviolet curable coating material, the temperature during the supply of the carbon dioxide, and the temperature during the mixing of them were adjusted with a single water bath temperature, and the temperatures were measured with thermometer 33. The supply pressure of the ultraviolet curable coating material was measured with the pressure gauge 16. The viscosity of the mixed fluid was calculated from the value of differential pressure transmitter 32. The supply pressure of the carbon dioxide was measured with pressure gauge 28. Regarding the saturation of the carbon dioxide, a capillary through which the mixed fluid flowed was provided, then the concentration of the carbon dioxide added to the ultraviolet curable coating material was changed, and an addition concentration at which a differential pressure before and after the change measured in differential pressure transmitter 32 was stabilized and the spray angle of the spray ejected from spray gun 44 was larger than the nominal spray angle of the nozzle used (50° in the present experiment) was taken as a saturated carbon dioxide concentration. A spray pressure was measured with pressure gauge 42. A temperature immediately before spraying was measured with thermometer 43. An applying speed means the moving speed of the spray gun. A nozzle of the spray gun was operated through a spray robot.

After the film formation by spraying, the formed coating film was heat-treated in a hot air dryer at 60° C. for 3 minutes.

The coating film was cured by ultraviolet irradiation using EYE mini GRANDAGE (ECS-151U) manufactured by Eye Graphics Co., Ltd. to obtain a cured film. The coating film was repeatedly irradiated with ultraviolet rays twice under a condition of a light amount of 200 mJ/cm² (cumulative light amount: 400 mJ/cm²).

(Constituent Raw Materials of Ultraviolet Curable Coating Material)

Ultraviolet curable acrylic monomers used were shown below. As an acrylic polyfunctional monomer, Viscoat 802 (registered trademark) (mixture of tripentaerythritol acrylate/mono and dipentaerythritol acrylates/polypentaerythritol acrylate) manufactured by Osaka Organic Chemical Co., Ltd.) was used (polyfunctional acrylate: 100% by mass). As an acrylic non-polyfunctional monomer, Viscoat 230 (registered trademark) (1,6-hexanediol diacrylate) serving as an acrylic bifunctional monomer manufactured by Osaka Organic Chemical Co., Ltd. was used. Irgacure (registered trademark) 184 (1-hydroxy-cyclohexyl-phenyl-ketone) manufactured by BASF was used as a photopolymerization initiator. Methyl ethyl ketone was used as a diluting solvent in Comparative Example 3.

As the ultraviolet curable coating material, a solution was prepared by mixing the ultraviolet curable acrylic monomer and the photopolymerization initiator at a composition mass ratio shown in the column of "coating material 1" in Table 1 below.

TABLE 1

|  | Acrylic polyfunctional monomer | Acrylic non-polyfunctional monomer | Diluted organic solvent | Photo-polymerization initiator |
|---|---|---|---|---|
| Coating material 1 | 70 | 30 | — | 3 |
| Coating material 2 | 88 | 12 | 5 | 3 |
| Coating material 3 | 80 | 20 | 5 | 3 |

Example 1

Stroke was adjusted from the relationship of flow rate/pump stroke previously obtained so that the discharge amount of the coating material high-pressure pump was set to 60 g/min. A scale was adjusted so that the discharge amount of the carbon dioxide high-pressure pump was set to 30 g/min as the value of the flow meter. An oval high-pressure nozzle (spray angle: 50°) having an orifice equivalent diameter of 0.13 mm was attached to the tip of the spray gun. A pressure immediately before the spray gun was the critical pressure (7.4 MPa) or more of the carbon dioxide (12 MPa). The primary pressure adjusting valve of the carbon dioxide was set to 14 MPa. Table 2 shows pressures, temperatures, and viscosity measurement results and the like.

The spray gun was attached to a two-dimensional coating robot, and a coating material was applied to a product obtained by slitting at a width of 300 mm a biaxially-stretched polyester film (COSMOSHINE (registered trademark) A4300 manufactured by TOYOBO CO., LTD.) having a thickness of 250 μm. The film to which the coating material was sprayed was held in an oven at 60° C. for 3 minutes, and the coating film was then cured under the ultraviolet irradiation conditions using the ultraviolet irradiator to obtain a cured film. The ultraviolet cured film was then evaluated. The evaluation results are shown in Table 2.

As a result, the obtained ultraviolet cured film had an average thickness of 1.2 μm and a three-dimensional central plane average surface roughness SRa of 0.0076 μm, and accordingly had excellent planarity.

Example 2

Application was performed in the same manner as in Example 1 except that the applying speed of the two-dimensional coating robot was changed in Example 1, to obtain an applied film. As shown in Table 2 below, the resulting ultraviolet cured film had an average thickness of 8.0 μm that was thick as compared with the case of Example 1, and had a three-dimensional central plane average surface roughness SRa of 0.0010 μm that was better planarity.

Example 3

Application was performed in the same manner as in Example 2 except that the heat treatment was not performed at 60° C. for 3 minutes before the curing treatment of the coating film in Example 2, to obtain an applied film. As shown in Table 2 below, the resulting ultraviolet cured film had an average thickness of 7.3 μm and a three-dimensional central plane average surface roughness SRa of 0.0360 μm. These results were slightly poorer than those in Examples 1 and 2, but were good planarity.

Comparative Example 1

Application was performed in the same manner as in Example 1 except that the carbon dioxide was not mixed with the coating material and the pressure immediately before the spray gun was 6 MPa that was less than the critical pressure (7.4 MPa) of the carbon dioxide in Example 1, to obtain an applied film. As a result of evaluating the resulting ultraviolet cured film, as shown in Table 2 below, the planarity of the ultraviolet cured film was poor.

Comparative Example 2

Application was performed in the same manner as in Example 1 except that the mixing ratio of the carbon dioxide was changed to a ratio shown in Table 2, and the pressure immediately before the spray gun was 6 MPa that was less than the critical pressure (7.4 MPa) of the carbon dioxide in Example 1, to obtain a coating film. As a result of evaluating the resulting ultraviolet cured film, as shown in Table 2 below, the planarity of the ultraviolet cured film was poor.

Comparative Example 3

Application was performed in the same manner as in Example 1 except that a coating material containing methyl ethyl ketone, as a diluent organic solvent, having a composition mass ratio shown in the column of "coating material 2" in Table 1 was used as the ultraviolet curable coating material in Example 1, to obtain an applied film. A pressure immediately before the spray gun was 12 MPa. As a result of evaluating the resulting ultraviolet cured film, as shown in Table 2 below, the planarity of the ultraviolet cured film was poor.

Comparative Example 4

Application was performed in the same manner as in Example 1 except that a coating material containing methyl ethyl ketone, as a diluent organic solvent, and having a composition mass ratio shown in the column of "coating material 3" in Table 1 was used as the ultraviolet curable coating material in Example 1, to obtain an applied film. A pressure immediately before the spray gun was 12 MPa. As a result of evaluating the resulting ultraviolet cured film, as shown in Table 2 below, the planarity of the ultraviolet cured film was poor.

TABLE 2

| | | Example 1 | Example 2 | Example 3 | Comparative Example 1 | Comparative Example 2 | Comparative Example 3 | Comparative Example 4 |
|---|---|---|---|---|---|---|---|---|
| Coating material | | Coating material 1 | Coating material 1 | Coating material 1 | Coating material 1 | Coating material 1 | Coating material 2 | Coating material 3 |
| Ultraviolet curable coating material supply conditions | Viscosity [mPa·s] | 35 | 35 | 35 | 35 | 35 | 84 | 35 |
| | Temperature [° C.] | 60 | 60 | 60 | 60 | 60 | 60 | 60 |
| | Pressure [MPa] | 10 | 10 | 10 | 10 | 10 | 10 | 10 |
| | Flow rate [g/min] | 60 | 60 | 60 | 60 | 60 | 60 | 60 |
| $CO_2$ supply conditions | Temperature [° C.] | 60 | 60 | 60 | — | 60 | 60 | 60 |
| | Pressure [MPa] | 14 | 14 | 14 | — | 14 | 14 | 14 |
| | Saturated $CO_2$ concentration [% by mass] | 20 | 20 | 20 | 20 | 20 | 20 | 20 |
| | $CO_2$ addition concentration [% by mass] | 50 | 50 | 50 | 0 | 10 | 50 | 50 |
| | $CO_2$ addition concentration/saturated $CO_2$ concentration | 2.5 | 2.5 | 2.5 | 0 | 0.5 | 2.5 | 2.5 |
| Mixing and spraying conditions | Temperature during mixing [° C.] | 60 | 60 | 60 | 60 | 60 | 60 | 60 |
| | Viscosity [mPa·s] | 1.3 | 1.3 | 1.3 | 35 | 10.8 | 27 | 1.5 |
| | Spray pressure [MPa] | 12 | 12 | 12 | 6 | 6 | 12 | 12 |
| | Temperature immediately before spraying [° C.] | 55 | 55 | 55 | 55 | 55 | 55 | 55 |
| Applying conditions | Applying speed [mm/s] | 190 | 50 | 50 | 190 | 190 | 190 | 190 |
| | Heat treatment | Presence | Presence | Absence | Presence | Presence | Presence | Presence |
| Physical properties of ultraviolet cured film | Applying width [mm] | 300 | 300 | 300 | 130 | 130 | 300 | 300 |
| | Average thickness [μm] | 1.2 | 8.0 | 7.3 | 5.3 | 4.2 | 8.0 | 6.5 |
| | Three-dimensional central plane average surface roughness [μm] | 0.0076 | 0.0010 | 0.0360 | 0.1600 | 0.0720 | 0.2040 | 0.0850 |

With reference to Table 2, in Examples 1 to 3, the ultraviolet curable coating material was mixed with the carbon dioxide at the critical pressure or more of the carbon dioxide without diluting the ultraviolet curable coating material with the organic solvent, to lower the viscosity of the mixed fluid. The ultraviolet curable coating material was sprayed at the critical pressure or more of the carbon dioxide and irradiated with ultraviolet rays, to provide a three-dimensional central plane average surface roughness SRa of as small as 0.0010 μm to 0.0360 μm. Accordingly, an ultraviolet cured film having excellent planarity and good appearance quality was obtained. That is, in Examples 1 to 3, VOC was reduced and an ultraviolet cured film having excellent planarity and good appearance quality was obtained in safe.

On the other hand, in Comparative Example 1, the ultraviolet curable coating material was not diluted with the organic solvent and the carbon dioxide was not also used, so that the viscosity of the fluid was increased. Accordingly, the obtained ultraviolet cured film had a three-dimensional central plane average surface roughness SRa of as large as 0.1600 μm, and thus had poor planarity and poor appearance quality. In Comparative Example 2, the ultraviolet curable coating material was mixed with the carbon dioxide at the critical pressure or more of the carbon dioxide without diluting the ultraviolet curable coating material with the organic solvent. However, the addition concentration of the carbon dioxide was less than the saturated concentration, so that the viscosity of the mixed fluid was increased. Further, the spray pressure was lower than the critical pressure of the carbon dioxide, and accordingly the obtained ultraviolet cured film had a three-dimensional central plane average surface roughness SRa of as large as 0.0720 μm, and thus had poor planarity and poor appearance quality. In Comparative Example 3, the organic solvent was used for dilution, so that there were problems of increase in an environmental load and deterioration in safety due to VOC.

Although the organic solvent and the carbon dioxide with the critical pressure or more were used, the viscosity of the mixed fluid was increased, so that the obtained ultraviolet cured film had a three-dimensional central plane average surface roughness SRa of as large as 0.2040 μm. The ultraviolet cured film thus had poor planarity and poor appearance quality. In Comparative Example 4, the organic solvent was used for dilution, so that there were problems of increase in an environmental load and deterioration in safety due to VOC. Although the organic solvent and the carbon dioxide with the critical pressure or more were used to reduce the viscosities of the ultraviolet curable coating material and the mixed fluid to the same extent as those in Examples 1 to 3, the obtained ultraviolet cured film had a three-dimensional central plane average surface roughness SRa of as large as 0.0850 μm. The ultraviolet cured film thus had poor planarity and poor appearance quality. This was considered to be because the added organic solvent was volatilized during spraying, and the ultraviolet curable coating material adhered to the workpiece to be coated was in a state before the dilution of the ultraviolet curable coating material by the organic solvent, and the viscosity of the ultraviolet curable coating material was increased.

It should be understood that the embodiment and examples disclosed herein are illustrative and non-restrictive in all respects. The scope of the present invention is defined by the claims, rather than the description above, and is intended to include any modifications within the meaning and scope equivalent to the claims.

INDUSTRIAL APPLICABILITY

As described in detail above, the present invention relates to a method for applying an ultraviolet curable coating material and a method for producing an ultraviolet cured film. The present invention can provide a novel low environmental load type application method and production method with no generation of VOC during application. The ultraviolet curable coating material as an application liquid does not contain an organic solvent as a dangerous substance, so that it is possible to provide a method for applying an ultraviolet curable coating material and a method for producing an ultraviolet cured film excellent in safety.

The present invention is a technique that can spray, under mixing with carbon dioxide and predetermined high pressure conditions, an ultraviolet curable coating material containing an ultraviolet curable acrylic monomer, the coating material being difficult to be applied with high planarity and being not diluted with an organic solvent. The present invention provides a coating film and ultraviolet cured film having high planarity. The present invention can directly apply an acrylic resin to an object having a three-dimensional cubic structure, in addition to a two-dimensional object such as a plastic film, without diluting the acrylic resin with an organic solvent. Accordingly, the present invention is extremely useful.

REFERENCE SIGNS LIST

1: Applying apparatus, 10: Coating material supply part, 10L: Coating material supply line, 11: Nitrogen gas cylinder, 12: Coating material tank, 13: Coating material high-pressure pump, 14, 41: Filter, 15: Coating material primary pressure adjusting valve, 16, 22, 26, 28, 42: Pressure gauge, 20: Carbon dioxide supply part, 20L: Carbon dioxide supply line, 21: Carbon dioxide cylinder, 23: Cooler, 24: Carbon dioxide high-pressure pump, 25: Carbon dioxide primary pressure adjusting valve, 27: Flow meter, 29: Carbon dioxide supply line back pressure valve, 30: Mixing part, 30L: Mixing line, 31: Mixer, 32; Differential pressure transmitter, 33, 43; Thermometer, 34: Temperature adjuster, 40: Spray part, 40L: Spray line, 44: Spray gun

The invention claimed is:

1. A method for applying an ultraviolet curable coating material, the method comprising the steps of:
supplying an ultraviolet curable coating material containing an ultraviolet curable acrylic monomer into a mixer under a condition of greater than or equal to 8 MPa without diluting the ultraviolet curable coating material with an organic solvent;
supplying carbon dioxide with a critical pressure or more into the mixer;
mixing the ultraviolet curable coating material and the carbon dioxide supplied into the mixer to form a mixed fluid;
spraying the mixed fluid under a condition of a critical pressure or more of the carbon dioxide to form a coating film; and
irradiating the coating film with ultraviolet rays to form an ultraviolet cured film,
wherein the ultraviolet curable coating material does not contain an organic solvent.

2. The method for applying an ultraviolet curable coating material according to claim 1, wherein in the mixed fluid, the carbon dioxide is mixed at an addition concentration greater than or equal to 1.0 time and less than or equal to 4.0 times of a saturation solubility in the ultraviolet curable coating material.

3. The method for applying an ultraviolet curable coating material according to claim 1 or 2, wherein a temperature of the mixed fluid before the spraying is heated at greater than or equal to 30° C. and less than or equal to 80° C.

4. The method for applying an ultraviolet curable coating material according to claim 1 or 2, wherein the mixer is a micro mixer having a micro flow path having a flow path diameter of less than or equal to 1 mm.

5. The method for applying an ultraviolet curable coating material according to claim 1 or 2, wherein
the ultraviolet curable acrylic monomer comprises (i) a trifunctional or higher acrylic polyfunctional monomer, or (ii) a trifunctional or higher acrylic polyfunctional monomer and a bifunctional or lower acrylic non-polyfunctional monomer, and
the ultraviolet curable coating material further comprises a photopolymerization initiator.

6. A method for producing an ultraviolet cured film, the method comprising the steps of:
supplying an ultraviolet curable coating material containing an ultraviolet curable acrylic monomer into a mixer under a condition of greater than or equal to 8 MPa without diluting the ultraviolet curable coating material with an organic solvent;
supplying carbon dioxide with a critical pressure or more into the mixer;
mixing the ultraviolet curable coating material and the carbon dioxide supplied into the mixer to form a mixed fluid;
spraying the mixed fluid under a condition of a critical pressure or more of the carbon dioxide to form a coating film; and
irradiating the coating film with ultraviolet rays to form an ultraviolet cured film,
wherein the ultraviolet curable coating material does not contain an organic solvent.

7. A method for producing an ultraviolet cured film on a plastic film, the method comprising the steps of:

supplying an ultraviolet curable coating material containing an ultraviolet curable acrylic monomer into a mixer under a condition of greater than or equal to 8 MPa without diluting the ultraviolet curable coating material with an organic solvent;

supplying carbon dioxide with a critical pressure or more into the mixer;

mixing the ultraviolet curable coating material and the carbon dioxide supplied into the mixer to form a mixed fluid;

spraying the mixed fluid on a plastic film serving as a workpiece to be coated under a condition of a critical pressure or more of the carbon dioxide to form a coating film; and irradiating the coating film with ultraviolet rays to form an ultraviolet cured film, the ultraviolet curable coating material does not contain an organic solvent.

\* \* \* \* \*

UNITED STATES PATENT AND TRADEMARK OFFICE
CERTIFICATE OF CORRECTION

PATENT NO. : 11,267,017 B2
APPLICATION NO. : 15/999737
DATED : March 8, 2022
INVENTOR(S) : Takii et al.

It is certified that error appears in the above-identified patent and that said Letters Patent is hereby corrected as shown below:

In the Claims

Column 21, Line 19, Claim 7, insert the word --wherein-- before the words "the ultraviolet"

Signed and Sealed this
Sixteenth Day of August, 2022

Katherine Kelly Vidal
*Director of the United States Patent and Trademark Office*